United States Patent Office 3,337,634
Patented Aug. 22, 1967

3,337,634
ALLENIC KETONES AND PROCESS FOR THEIR PREPARATION
Benjamin Thompson, Kingsport, Tenn., assignor to Eastman Kodak Company, Rochester, N.Y., a corporation of New Jersey
No Drawing. Filed May 7, 1963, Ser. No. 278,769
14 Claims. (Cl. 260—593)

This invention relates to new unsaturated ketones having two adjacent carbon-carbon double bonds such as in allene and to a novel process for their preparation.

The new unsaturated allenic ketones of my invention have the formula:

I. 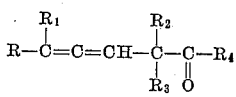

wherein R and $R_1$ each represent a hydrogen atom or an alkyl radical and $R_2$, $R_3$ and $R_4$ each represent an alkyl radical. When $R_1$ is an alkyl radical, it is ordinarily a lower alkyl radical. $R_2$ and $R_3$ are ordinarily lower alkyl radicals. These new allenic ketone compounds are prepared in accordance with the novel process of my invention by heating an aliphatic ketone having a single hydrogen atom on an alpha carbon atom with a suitable acetylenic alcohol in the presence of an acidic catalyst.

The aliphatic ketones employed in the process of my invention have the formula:

II. 

wherein $R_4$ has the meaning previously assigned to it and $R_5$ represents an alkyl radical having at least three carbon atoms joined to the carbonyl carbon atom through a carbon atom having a single hydrogen atom attached thereto. These ketones have at least five carbon atoms.

Methyl isopropyl ketone, diisopropyl ketone, ethyl isopropyl ketone, n-propyl isopropyl ketone, n-butyl isopropyl ketone, tertiarybutyl isopropyl ketone, sec. butyl isopropyl ketone, n-pentyl isopropyl ketone, n-hexyl isopropyl ketone, isopropyl isobutyl ketone, methyl sec. butyl ketone, di-sec. butyl ketone, ethyl sec. butyl ketone, n-propyl sec. butyl ketone, n-butyl sec. butyl ketone and n-pentyl sec. butyl ketone, for example, are illustrative of the ketones used in the process of my invention.

The acetylenic alcohols suitable for my process include propargyl alcohol and substituted propargyl alcohols of the following structure:

III. 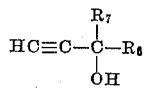

wherein $R_6$ and $R_7$ each represent a hydrogen atom or an alkyl radical. It is to be noted that the acetylenic alcohols employed in the process of my invention contain the hydroxyl group on a carbon atom adjacent to the acetylenic group.

Propargyl alcohol (1-propyn-3-ol), 1-butyn-3-ol, 1-pentyn-3-ol, 1-hexyn-3-ol, 3-methyl-1-butyn-3-ol, 3-methyl-1-pentyn-3-ol, 4-methyl-1-pentyn-3-ol, 3-ethyl-1-pentyn-3-ol, 3-ethyl-1-heptyn-3-ol, 1-heptyn-3-ol, 1-octyn-3-ol, 3,7-dimethyl-1-octyn-3-ol, 3,7,11-trimethyl-1-dodecyn-3-ol and 3,7,11,15-tetramethyl-1-hexadecyn-3-ol, for example, are illustrative of the acetylenic alcohols used in the process of my invention.

Insofar as the process of my invention is concerned, the number of carbon atoms in the alkyl radicals represented by $R_4$, $R_5$, $R_6$ and $R_7$ appears to be immaterial. When $R_1$ is an alkyl radical it is usually methyl. $R_2$ and $R_3$ are usually methyl. When R is an alkyl radical, it is ordinarily an alkyl radical containing 1 to 16 carbon atoms.

The new allenic ketones of my invention are prepared in accordance with the novel process of my invention by heating a ketone having the Formula II with a propargyl alcohol having the Formula III in the liquid phase in the presence of an acidic catalyst. The reaction can be conveniently carried out under refluxing conditions.

Virtually any type of acidic material will catalyze the reaction. An aromatic sulfonic acid such as p-toluene sulfonic acid, o-toluene sulfonic acid, m-toluene sulfonic acid or benzene sulfonic acid, for example, Lewis acids, a mineral acid such as phosphoric acid or sulfuric acid, for example, methionic acid, boron trifluoride, acidic ion exchange resins, etc., for example, are illustrative of suitable acidic catalytic materials. The reaction is ordinarily carried out in the presence of an organic diluent which is inert under the reaction conditions employed. Benzene, p-xylene, diisopropyl benzene, diphenyl ether, and cymene, for example, are illustrative of the inert organic diluents that can be employed.

The new allenic ketones of my invention are useful in the perfume industry as odor-imparting agents in the preparation of perfumes and of scented compositions generally. Thus, for example, they can be incorporated in from about 0.5% to about 2% concentration by weight into milled toilet soap to give the soap a pleasant scent.

The new allenic ketones of my invention are also useful intermediates in organic syntheses. They can be hydrogenated to the corresponding saturated ketones or alcohols which have excellent solvent power for nitrocellulose and are useful in nitrocellulose lacquer compositions. To illustrate, 3,3-dimethyl-4,5-hexadien-2-one (described hereinafter) can be hydrogenated to 3,3-dimethyl hexanone-2 which is a solvent for nitrocellulose and useful in nitrocellulose lacquer compositions.

The use of a tertiary acetylenic alcohol, such as 3-methyl-1-butyn-3-ol, 3-methyl-1-pentyn-3-ol and 3,7-dimethyl-1-octyn-3-ol, for example, in the process of my invention produces a product in which the fourth carbon atom from the carbonyl carbon atom is always disubstituted (i.e., R and $R_1$ are alkyl). The activity of the fourth carbon atom from the carbonyl carbon atom of the allenic ketone product is affected by the amount of substitution. When the fourth carbon atom contains two alkyl radicals hydration of the allenic ketone gives different products than those obtained when the fourth carbon atom of the allenic ketone is unsubstituted or contains but one alkyl radical.

It is to be noted that in the novel allenic ketones of my invention the carbon atom between the carbonyl group and the allenic group is substituted with two alkyl radicals. The presence of these two alkyl radicals eliminates the possibility of the allenic ketone compounds of my invention isomerizing to form olefinic linkages conjugated with the carbonyl group.

The following examples illustrate the new allenic ketones and the new process of my invention.

Example 1

A solution of 172 grams of 3-methyl-2-butanone (methyl isopropyl ketone), 112 grams of propargyl alcohol, 0.1 gram of methionic acid, 0.1 gram of hydroquinone and 50 grams of benzene was refluxed in a still having means for removal of water condensed at the head. After about the theoretical amount of water had been separated, the reaction mixture was distilled under vacuum. After removal of the solvent (benzene) and unreacted starting materials over 100 grams of crude product was obtained which, on careful fractionation, gave 3,3-dimethyl-4,5-hexadien-2-one, having the formula:

$$CH_2=C=CH-\underset{\underset{CH_3}{|}}{\overset{\overset{CH_3}{|}}{C}}-\overset{O}{\overset{\|}{C}}-CH_3$$

$n_D^{20}$ 1.4600, B.P. 60° C. at 22 mm. in 40% yield. This product was identified by infrared and NMR analyses as well as by molecular weight, carbon, hydrogen, and carbonyl analyses.

*Analysis.*—Theory: 9.74% H, 77.37% C, 13.68% $O_2$, 19.0% CO. Found: 9.45% H, 76.98% C, 13.70% $O_2$, 19.0% CO.

Example 2

314 grams of diisopropyl ketone, 154 grams of propargyl alcohol, 52 grams of p-xylene, 1.0 grams of p-toluenesulfonic acid and 1.0 grams of hydroquinone were refluxed in a still having a decanting head. After 55 grams of water were removed the charge was flash distilled and then fractionated to isolate over 50 grams of 2,4,4-trimethyl-5,6-heptadien-3-one, $n_D^{20}$ 1.4570, B.P. 44° C. at 4.2 mm.

Using a larger amount of propargyl alcohol the above product reacted again to give the disubstituted ketone, di(1,1-dimethyl-2,3-butadienyl)ketone.

Example 3

86 grams of methyl isopropyl ketone (1 mole), 147 grams of 1-hexyn-3-ol (1.5 mole), 100 grams of p-xylene and 0.5 gram of p-toluenesulfonic acid were refluxed in a still until 25 grams of water separated at the head. Flash distillation followed by fractionation yielded 3,3-dimethyl-4,5-nonadien-2-one, $n_D^{20}$ 1.4637, B.P. 47° C. at 0.8 mm. Infrared analysis shows the presence of the allenic unsaturation as in the other products.

Example 4

Example 3 was repeated using 114 grams of diisopropyl ketone in place of methyl isopropyl ketone. 2,4,4-trimethyl-5,6-decadien-3-one, $n_D^{20}$ 1.4647, B.P. 60° C. at 0.7 mm. was obtained. The structure of this product was confirmed by infrared and NMR analyses.

Example 5

By the use of 100 grams of ethyl isopropyl ketone in Example 3 in place of methyl isopropyl ketone 4,4-dimethyl-5,6-decadien-3-one is obtained.

Example 6

By the use of 228 grams of n-propyl isopropyl ketone in Example 1 in place of methyl isopropyl ketone 5,5-dimethyl-6,7-octadien-4-one is obtained.

Example 7

By the use of 128 grams of n-butyl isopropyl ketone in Example 3 in place of methyl isopropyl ketone 6,6-dimethyl-7,8-dodecadien-5-one is obtained.

Example 8

By the use of 126 grams of 3-methyl-1-butyn-3-ol in Example 3 in place of 1-hexyn-3-ol 3,3,6-trimethyl-4,5-heptadien-2-one is obtained.

The following tabulation further illustrates the new allenic ketone compounds of my invention. The allenic ketone compounds set forth hereinafter are readily prepared by reacting the aliphatic ketone compounds indicated with the propargyl alcohol indicated in accordance with the procedure set forth hereinbefore such as that described in Examples 1 to 4, for example.

| Example No. | Aliphatic Ketone | Propargyl Alchol | Allenic Ketone |
|---|---|---|---|
| 9 | Tertiary butyl isopropyl ketone | Propargyl alcohol | 2,2,4,4-tetramethyl-5,6-heptadien-3-one. |
| 10 | Isopropyl isobutyl ketone | 1-pentyn-3-ol | 2,5,5-trimethyl-6,7-decadien-4-one. |
| 11 | Methyl sec. butyl ketone | 1-heptyn-3-ol | 3-methyl-3-ethyl-4,5-decadien-2-one. |
| 12 | n-Pentyl isopropyl ketone | Propargyl alcohol | 7,7-dimethyl-8,9-decadien-6-one. |
| 13 | n-Hexyl isopropyl ketone | ----do---- | 8,8-dimethyl-9,10-undecadien-7-one. |
| 14 | n-Pentyl sec. butyl ketone | ----do---- | 7-methyl-7-ethyl-8,9-decadien-6-one. |
| 15 | Methyl isopropyl ketone | 1-octyn-3-ol | 3,3-dimethyl-4,5-undecadien-2-one. |
| 16 | ----do---- | 3,7-dimethyl-1-octyn-3-ol | 3,3,6,10-tetramethyl-4-5, undecadien-2-one. |
| 17 | ----do---- | 3,7,11-trimethyl-1-dodecyn-3-ol | 3,3,6,10,14-pentamethyl-4,5-pentadecyn-2-one. |
| 18 | ----do---- | 3,7,11,15-tetramethyl-1-hexadecyn-3-ol | 3,3,6,10,14,19-hexamethyl-4,5-nonadecyn-2-one. |
| 19 | ----do---- | 3-methyl-1-pentyn-3-ol | 3,3,6-trimethyl-4,5-octadien-2-one. |
| 20 | ----do---- | 4-methyl-1-pentyn-3-ol | 3,3,7-trimethyl-4,5-octadien-2-one. |

When the aliphatic ketone contains two alpha carbon atoms having a single hydrogen atom and the alkyl radicals attached to the carbonyl carbon atom are different, mixtures of allenic ketones are obtained. Thus when sec. butyl isopropyl ketone is reacted with 1-pentyn-3-ol, for example, a mixture of 3,5,5-trimethyl-6,7-decadien-4-one and 2,4-dimethyl-4-ethyl-5,6-nonadien-3-one is obtained. However, when diisopropyl ketone is reacted with 1-pentyn-3-ol, for example, the allenic ketone obtained is 2,4,4-trimethyl-5,6-nonadien-3-one. Similarly, when di(sec. butyl) ketone is reacted with 1-pentyn-3-ol, for example, the allenic ketone obtained is 3,5-dimethyl-5-ethyl-6,7-decadien-4-one.

The invention has been described with reference to certain preferred embodiments, but it will be understood that variations and modifications can be made within the scope of the invention defined in the following claims.

I claim:

1. A process for preparing compounds having the formula:

$$R-\overset{\overset{R_1}{|}}{C}=C=CH-\underset{\underset{R_3}{|}}{\overset{\overset{R_2}{|}}{C}}-\overset{O}{\overset{\|}{C}}-R_4$$

wherein R and $R_1$ are each selected from the class consisting of a hydrogen atom and alkyl radicals and $R_2$, $R_3$ and $R_4$ each represent an alkyl radical which comprises heating a ketone having the formula:

$$R_5-\overset{O}{\overset{\|}{C}}-R_4$$

wherein $R_4$ has the meaning previously assigned to it and $R_5$ represents an alkyl radical having at least three carbon atoms joined to the carbonyl carbon atom through a carbon atom having a single hydrogen atom attached thereto with an acetylenic alcohol having the formula:

$$HC\equiv C-\underset{\underset{OH}{|}}{\overset{\overset{R_7}{|}}{C}}-R_6$$

wherein $R_6$ and $R_7$ are each selected from the class consisting of a hydrogen atom and alkyl radicals in the presence of an acidic catalyst.

2. A process according to claim 1 wherein the reaction is carried out in the presence of an inert organic diluent.

3. A process according to claim 1 wherein the reaction is carried out in the presence of an inert organic diluent under refluxing conditions.

4. A process for preparing 3,3-dimethyl-4,5-hexadien-2-one which comprises heating methyl isopropyl ketone with propargyl alcohol in the presence of an acidic catalyst.

5. A process for preparing 2,4,4-trimethyl-5,6-heptadien-3-one which comprises heating diisopropyl ketone with propargyl alcohol in the presence of an acidic catalyst.

6. A process for preparing 3,3-dimethyl-4,5-nonadien-2-one which comprises heating methyl isopropyl ketone with 1-hexyn-3-ol in the presence of an acidic catalyst.

7. A process for preparing 2,4,4-trimethyl-5,6-decadien-3-one which comprises heating diisopropyl ketone with 1-hexyn-3-ol in the presence of an acidic catalyst.

8. A process for preparing 4,4-dimethyl-5,6-decadien-3-one which comprises heating ethyl isopropyl ketone with 1-hexyn-3-ol in the presence of an acidic catalyst.

9. The compound 3,3-dimethyl-4,5-hexadien-2-one.
10. The compound 2,4,4-trimethyl-5,6-heptadien-3-one.
11. The compound 3,3-dimethyl-4,5-nonadien-2-one.
12. The compound 2,4,4-trimethyl-5,6-decadien-3-one.
13. The compound 4,4-dimethyl-5,6-decadien-3-one.
14. The compounds having the formula:

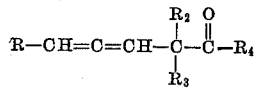

wherein R is selected from the class consisting of a hydrogen atom and alkyl radicals and $R_2$, $R_3$ and $R_4$ each represent an alkyl radical.

References Cited

UNITED STATES PATENTS 3,029,287  4/1962  Marbet et al. _____ 260—593

LEON ZITVER, *Primary Examiner.*

DANIEL D. HORWITZ, *Examiner.*